(12) United States Patent
Huang

(10) Patent No.: US 9,061,542 B1
(45) Date of Patent: Jun. 23, 2015

(54) GLASS TOUCH SCREEN PROTECTOR

(71) Applicant: AEVOE INTERNATIONAL LTD., Tortola (VG)

(72) Inventor: Cheng-Su Huang, Taipei (TW)

(73) Assignee: AEVOE INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/485,196

(22) Filed: Sep. 12, 2014

(30) Foreign Application Priority Data

Sep. 2, 2014 (TW) .............................. 103215690 U (51) Int. Cl.
*B44C 5/08* (2006.01)
*B44F 1/06* (2006.01)

(52) U.S. Cl.
CPC ............... *B44F 1/063* (2013.01); *Y10T 428/14* (2015.01)

(58) Field of Classification Search
CPC ...... B44F 1/063; B44C 5/08; B32B 17/10036
USPC .................................... 428/38, 188, 345, 173
See application file for complete search history.

(56) References Cited

U.S. PATENT DOCUMENTS

| | | | |
|---|---|---|---|
| 3,948,662 A | 4/1976 | Alston |
| 3,950,580 A | 4/1976 | Boudet |
| 4,889,754 A | 12/1989 | Vargas |
| 5,486,883 A | 1/1996 | Candido |
| 5,668,612 A | 9/1997 | Hung |
| 6,469,752 B1 | 10/2002 | Ishikawa |
| 6,536,589 B2 | 3/2003 | Chang |
| 6,555,235 B1 | 4/2003 | Aufderheide |
| 6,559,902 B1 | 5/2003 | Kusuda |
| 6,667,738 B2 | 12/2003 | Murphy |
| 6,750,922 B1 | 6/2004 | Benning |
| 6,777,055 B2 | 8/2004 | Janssen |
| 6,800,378 B2 | 10/2004 | Hawa |

(Continued)

FOREIGN PATENT DOCUMENTS

| | | |
|---|---|---|
| DE | 19808535 | 9/1999 |
| EP | 1471415 | 10/2004 |

(Continued)

OTHER PUBLICATIONS

Non-Final Office Action mailed Jun. 25, 2014; in U.S. Appl. No. 12/780,443.

(Continued)

*Primary Examiner* — Brent O'Hern
(74) *Attorney, Agent, or Firm* — Novak Druce Connolly Bove + Quigg LLP (57) ABSTRACT

A glass touch screen protector for a portable electronic device having a front face that includes a touch screen portion and a chamfered outer perimeter, the glass screen protector including a glass sheet having front and back sides, an outer band that corresponds to that of the device, and having a transparent window portion that corresponds in size to the touch screen portion. A spacer is provided along the outer perimeter of the glass sheet substantially continuously surrounding the transparent window. The spacer increases in thickness toward the periphery of the glass sheet and has a thickness sufficient to space the glass sheet near but not in contact with the touch screen portion. The spacer has an exposed adhesive facing the portable device and having adhesive strength enabling repeated removal and re-attachment.

28 Claims, 4 Drawing Sheets

(56) References Cited

U.S. PATENT DOCUMENTS

| | | |
|---|---|---|
| 6,864,882 B2 | 3/2005 | Newton |
| 6,879,319 B2 | 4/2005 | Cok |
| 6,995,976 B2 | 2/2006 | Richardson |
| 7,070,837 B2 | 7/2006 | Ross |
| 7,226,176 B1 | 6/2007 | Huang |
| 7,495,895 B2 | 2/2009 | Carnevali |
| 8,044,942 B1 | 10/2011 | Leonhard et al. |
| 2002/0101411 A1 | 8/2002 | Chang |
| 2002/0122925 A1 | 9/2002 | Liu et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0227722 A1 | 11/2004 | Friberg et al. |
| 2006/0114245 A1 | 6/2006 | Masters et al. |
| 2007/0181456 A1 | 8/2007 | Kusuda et al. |
| 2007/0212508 A1 | 9/2007 | Mase |
| 2008/0030631 A1 | 2/2008 | Gallagher |
| 2008/0055258 A1 | 3/2008 | Sauers |
| 2010/0026646 A1 | 2/2010 | Xiao et al. |
| 2010/0102197 A1 | 4/2010 | McIntyre |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0279383 A1 | 11/2011 | Wilson et al. |
| 2012/0105359 A1* | 5/2012 | Kim et al. .............. 345/174 |

FOREIGN PATENT DOCUMENTS

| | | |
|---|---|---|
| JP | 2002328613 | 11/2002 |
| TW | 200700793 | 1/2007 |
| TW | 201027992 | 7/2010 |
| WO | 03052678 | 6/2003 |

OTHER PUBLICATIONS

Non-Final Office Action mailed Nov. 29, 2013; in U.S. Appl. No. 13/411,372.

Non-Final Office Action mailed Jan. 16, 2014; in U.S. Appl. No. 14/078,245.

Non-Final Office Action mailed Dec. 23, 2014; in U.S. Appl. No. 14/485,196.

iVisor AG—Screen Protector for iPad; http://store.moshimonde.com/ivisor-ag-ipad.html; published 2004-2010 and retrieved Jun. 8, 2011.

Amendment in Response to the Office Action mailed Jul. 12, 2005; in U.S. Appl. No. 10/436,594.

Gaecke, Jake; "Appletell reviews the iVisor AG for iPad", appletell.com Sep. 15, 2010; http://www.appletell.com/apple/comment/appletell-reviews-ivisor-ag-for-ipad.

iVisor AG-Screen protector for iPad; 100% Bubble Free iVisor AG iPad Screen Protector; http://store.moshimonde.com/ivisor-ag-ipad.html; published 2004-2010 and retrieved on Jun. 8, 2011.

iVisorAG for iPad 2 Black; http://store.moshimonde.com/ivisorage-for-ipad2-black.html; published 2004-2010 and retrieved Jun. 8, 2011.

iVisor AG for iPhone 4 white; http://store.moshimonde.com/ivisor-ag-iphone4-white.html; published 2004-2010 and retrieved Jun. 8, 2011.

iVisor AG for iPhone 4 black; http://store.moshimonde.com/ivisor-ag-iphone4-black.html.; published 2004-10 and retrieved Jun. 8, 2011.

iVisor AG for iPad 2 black; http://store.moshimonde.com/ivisorag-for-ipad2-black.html; published 2004-2010 and retrieved Jun. 8, 2011.

iVisor AG for iPad 2 white; http://store.moshimonde.com/ivisor-for-ipad2-white.html.; published 2004-2010 and retrieved Jun. 8, 2011.

iVisor XT Crystal Clear Protector for iPad; http://store.moshimonde.com/ivisor-xt-ipad.html; published 2004-2010 and retrieved Jun. 8, 2011.

Screen Protectors Incipio Technologies; http://incipiotech.com/tag/screen-protectors; 2008 and retrieved Jun. 8, 2011.

SGP iPhone 4 Screen and Body Protector Set Incredible Shield Series; published 2010; http://www.sgpstore.com/cell-phone/apple-iphone/iphone-4/sgp-iphone-4-screen-body-protector-set-incredible-shield-series.html.

What makes NuShield Screen Protectors Superior; http://www.nushield.com/technology.php. retrieved Jan. 9, 2015.

"Invisible Shield" zagg.com published 2005-2011; http://www.zagg.com/invisibleshield/apple-ipad-2-3g-cases-screen-protectorscovers-skins-shields-1.php.

Machine translation for DE19808535; published Sep. 2, 1999 and retrieved on Jul. 18, 2011.

Machine translation for JP2002328613; published on Nov. 15, 2002.

English abstract for TW200700793; published Jan. 1, 2007 and published Jan. 9, 2015.

Machine translation for TW201027992; published Jul. 16, 2010.

* cited by examiner

GLASS TOUCH SCREEN PROTECTOR

FIELD

The present disclosure relates to a glass touch screen protector. In particular, the disclosure relates to a glass touch screen protector for mobile hand held devices.

BACKGROUND

With the ever increasing popularity of the touch screen portable electronic devices, a demand for effective touch screen protectors has developed. Several kinds of touch screen protectors are currently available. For example, many touch screen protectors employ polyethylene terephthalate (PET) or some type of transparent plastic to guard and protect the display screen. Additionally, many commercial touch screen protectors have a tendency to trap air bubbles and dust, despite careful application. When in use, the touch screen protectors are in direct physical contact with the touch screen of the electronic device, either by static or application of adhesives. Additionally, when the screen protectors are removed, diligent cleaning may be needed to restore the touch screen to its original luster.

BRIEF DESCRIPTION OF THE DRAWINGS

Implementations of the present application will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without these specific details. In other instances, methods, procedures and components have not been described in detail so as not to obscure the related relevant function being described. Also, the description is not to be considered as limiting the scope of the implementations described herein. It will be understood that descriptions and characterizations of embodiments set forth in this disclosure are not to be considered as mutually exclusive, unless otherwise noted.

The following definitions are used in this disclosure: The term "near" as used herein means close in distance but not in physical contact, for example about or less than 1 mm apart. The term "periphery" as used herein means the outermost part or region within a precise boundary. The term "touch screen portion" as used herein means the functional portion of the touch screen of the portable electronic device. The term "non-functional band around the perimeter" as used herein means the area surrounding the touch screen portion of the portable electronic device which can be made of a different material or made of the same material as the touch screen but is not touch sensitive. Generally, the term "touch screen" as used herein means a single glass sheet that includes the operable touch screen portion and the non-functional band around the perimeter of the touch screen portion. The touch screen may also include one or more inoperable portions, however, such touch screen will always include an operable touch screen portion. In many recent devices, the touch screen portion makes up the vast majority touch screen, with the non-functional band around the perimeter taking up only a small area of the touch screen. The term "front face" of a portable electronic device refers to the top surface which can be seen from an overhead view. The term "anti-static" is used to mean that the glass sheet does not generate static electricity when contacted or rubbed by the user.

A glass touch screen protector can be used to protect touch screens of many different kinds of portable electronic devices, such as a mobile telephone, reading device, music device, viewing devices, navigation device or other portable electronic devices. Examples of such devices are iPhone, Nook, iPod, iPad, Droid, and GPS navigation systems. The nature of the glass touch screen protector and its design enable specific embodiments to be adapted to conform to the touch screen of any such portable electronic device. For example, the shape of the glass touch screen protector can have corners that are rounded or beveled to match those of the portable electronic devices.

Figure 1:
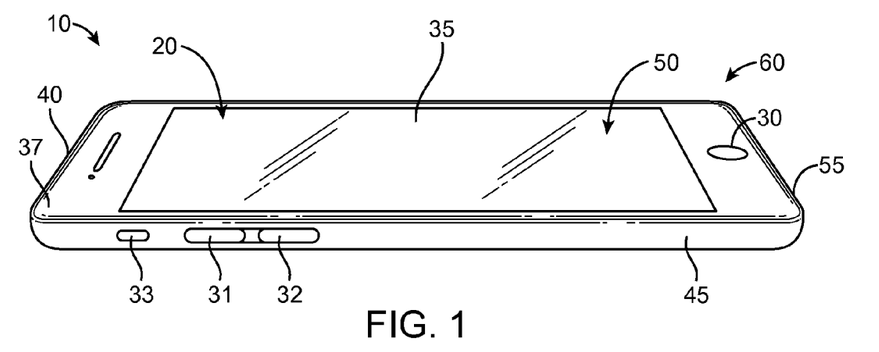
FIG. 1 is a diagram of an exemplary portable electronic device.

More recently, many portable electronic devices have begun to have a chamfered edge along the outer perimeter of the front face of the device. This chamfered edge can also be referred to herein as a beveled or curved edge. The chamfered edge refers a portion which connects the flat portion of the touch screen with a side edge of the device and which is not perpendicular to either. The chamfered edge portion around the perimeter can be either the touch screen and/or other segment of the front face surrounding the touch screen. In some instances, the touch screen will curve seamlessly to the side edge. In other examples, the touch screen may terminate and another component of the front face of the device may extend to the side edge. One example is shown in FIG. 1, where there is illustrated a portable electronic device 10 which is sized to be hand held. The portable electronic device 10 can have a touch screen 20. The touch screen 20 has a touch screen portion 35 for operation of the device as well as non-functional band 37 around the perimeter 40. The portable electronic device 10 can also have a general functional button 30 as well as other functional buttons such as volume 31, 32 or mute button 33. Notably, the device 10 has a side edge 45 and a front face having flat (or substantially flat) portion 50. The flat portion 50 of the touch screen 20 curves to the side edge 45 via chamfered portion 55. In other examples, the side edge 45 is itself curved, arc shaped or parabolic, and in any of these instances the extreme end may be considered the side edge 45. The chamfered portion 55 can be made up of a portion of the touch screen 20. In some instances, prior to the chamfered portion 55 or along its length the touch screen 20 may terminate and the surface continue as a plastic or metal surface. Accordingly, the front face 60 of the portable device 10 includes both the flat surface 50 and the chamfered portion 55, the entirety of which may be the touch screen 20, or as noted, may terminate as it extends toward the periphery of the front face 60 and continue as a plastic or metal surface.

Figure 2:
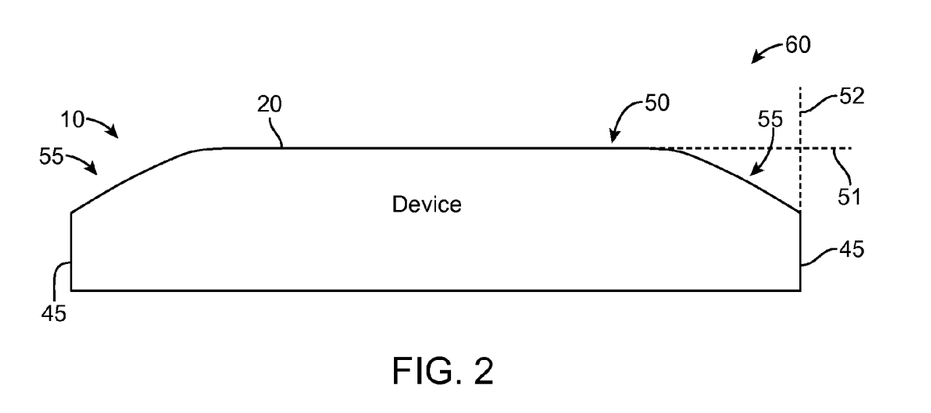
FIG. 2 is a diagram of an exemplary portable electronic device.

In order to illustrate the chamfered portion, a cross-section view of portable electronic device 10 is illustrated in FIG. 2 in FIG. 1 having a front face 60 with a flat portion 50 and an exaggerated chamfered portion 55. In the illustrated embodiment, the touch screen 20 extends across the front face 60 to also include the flat portion 50 and chamfered portion 55. The flat portion 50 extends horizontally within horizontal plane 51. Additionally, the side edge 45 extends within vertical plane 52. As shown, the chamfered portion 55 declines from the flat portion 50 to the side edge 45. Accordingly, the chamfered portion 55 can be described as a ramped decline from the flat portion 50. The chamfered portion 55 is not perpendicular with either the flat portion 50 or the on either side (the curved portion 55). The chamfered portion 55 in FIG. 2 is shown as slightly curved as it extends from the flat portion 50 to the side edge 45. In other examples, the chamfered portion 55 may be straight, concave or otherwise curved. The chamfered portion 55 may also be considered as the portion of the front face which curves away from the flat portion 50 toward the periphery.

A glass screen protector as disclosed herein can be employed to protect the touch screen of the portable electronic device 10. However, glass is generally planar (or slightly convex when oriented properly on the device) and thus cannot generally bend to accommodate the chamfered portions of portable electronic devices. As further described below a spacer is disclosed herein which complements the declining shape of the chamfered portion in order to space the glass protector from the glass sheet of the portable electronic device. This permits the glass screen protector to extend across the entire front face of a portable electronic device to the outer edge of the device.

Figure 3:
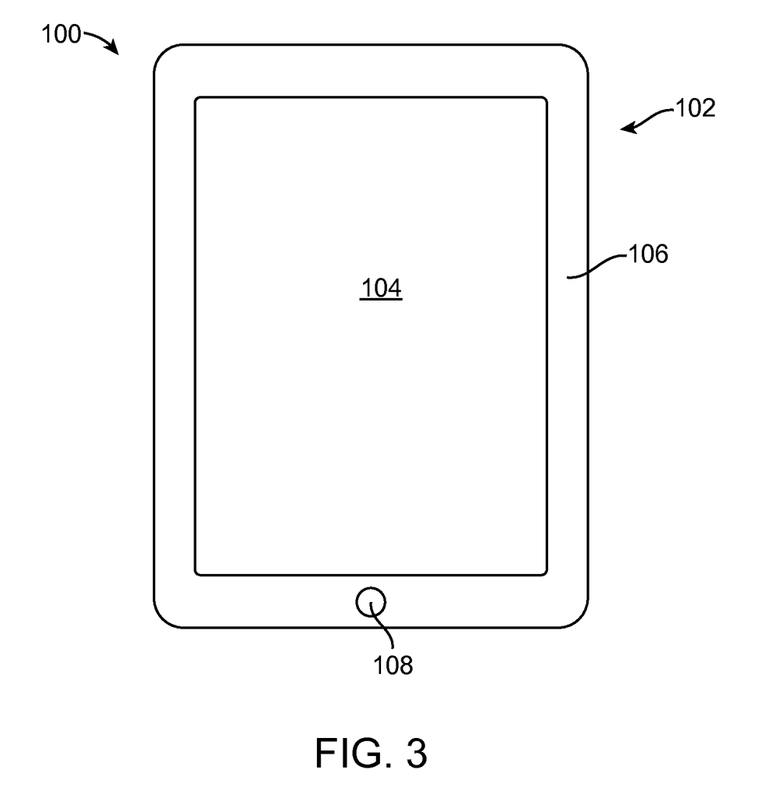
FIG. 3 is a diagram of one example of a glass touch screen protector according to the disclosure herein.

A top view of a glass touch screen protector in accordance with an exemplary embodiment is illustrated in FIG. 3. As shown, the glass touch screen protector 100 can correspond to the shape of a portable hand held device, and thus can be generally rectangular. However, the shape of the glass touch screen protector 100 is not limited to only generally rectangular shapes, but can be rounded or have other polygonal shape to correspond to the shape of a desired device and touch screen. The glass touch screen protector 100 can include a glass sheet 102 and a spacer (shown in FIGS. 5-6). The glass sheet 102 can be shaped and have dimensions that substantially correspond to the shape and dimensions of a front face of a portable electronic device. The glass sheet 102 can include a transparent window portion 104 and a band 106 surrounding the perimeter of the transparent window portion 104. In some examples, the transparent window portion 104 and the band 106 can be a single component. In some embodiments the transparent window portion 104 and the band 106 can be different components. The transparent window portion 104 can substantially correspond to the touch screen portion of the portable electronic device. The light transmission of the transparent window portion 104 can be between about 90%-99%. The band 106 can be opaque or non-opaque. Accordingly, in some embodiments, when the window portion 104 and the band 106 are the same embodiment, the opacity can be provided by a layer of ink or paint on the surface of the band 106. In other embodiments, the band 106 can be tinted glass.

The band 106 can essentially conform to the non-functional band that surrounds the touch screen portion. The band 106 can include one or more holes 108 corresponding to one or more buttons of the portable electronic device. For example, as shown, the band 106 can have a hole 108 that corresponds to the on-off selector button of an iPhone or iPad. By exposing the buttons for ease of operation, the one or more holes 108 can act as alignment features to facilitate proper mounting of the glass touch screen protector 100 on the portable electronic device.

The glass sheet 102 can be sufficiently hard or stiff to prevent the glass sheet 102 from bending or collapsing under its own weight and/or to avoid the transparent window portion 104 being pressed against the touch screen portion when pressure is applied to the glass sheet 102 during normal use. For example, when pressure is applied to the transparent window portion 104, the transparent window portion 104 may flex but should not contact the touch screen portion when a reasonable amount of pressure is applied to the transparent window portion 104. To accomplish this, the glass sheet 102 can be sufficiently thin and have sufficient elasticity to withstand excessive pressure, for example, excessive pressure to cause the transparent window portion 104 to flex and contact the touch screen portion. The hardness of the glass sheet 102 can be between about 7 and about 9, as determined by Mohs scale of hardness values. In some embodiments, the hardness of the transparent window portion 104 can be more or less than about 7 and about 9 on the Mohs scale of hardness values.

The transparent window portion 104 can be made of any suitable transparent material available. The transparent window portion 104 can be silica based. In some embodiments, the transparent window portion 104 can be soda-lime glass, lead glass, flint glass, sodium borosilicate glass, oxide glass or any other suitable transparent material. In some embodiments, the transparent window portion 104 can be made of Willow Glass™ by Corning Inc. of Corning, N.Y.

Figure 4:
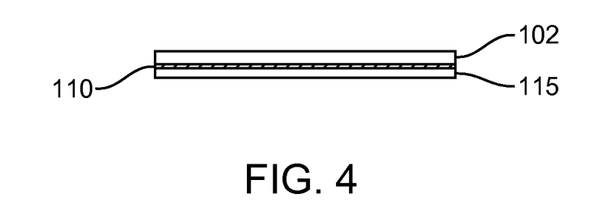
FIG. 4 is a diagram of one example of a glass touch screen according to the disclosure herein.

FIG. 4 illustrates a cross-sectional view of one example of a glass sheet 102 herein. The thickness of the transparent window portion 104 can be in the range of about 0.1 mm to 1.0 mm, or alternatively, 0.1 mm to 0.6 mm. The glass sheet can have a paint layer 110 on its underside. The paint layer 110 can be the band 106 which can essentially conform to the non-functional band that surrounds the touch screen portion of portable electronic device. The paint layer can be 1.0 mm or less in thickness. Additionally, an anti-shatter membrane 115 can be adhered to the underside of the paint layer 110 and glass sheet 102. For example, because the paint layer 110 extends only around the perimeter of the glass sheet, the anti-shatter membrane 115 adheres to the paint layer 110 around this perimeter and directly to the glass sheet 102 around the interior portion of the glass sheet 102. If no paint layer 110 is provided, the anti-shatter membrane 115 can be adhered directly to the entire underside of the glass sheet 102. Accordingly, the anti-shatter membrane adheres directly or indirectly to the underside of the glass sheet (beneath both the transparent window portion 104 and band 106). The anti-shatter membrane prevents the glass sheet 102 from shattering, and if shatters, aids in preventing the glass from breaking into smaller scattered pieces which can endanger the fingers of a user. The anti-shatter membrane 115 can be made up of a transparent flexible polymeric material such as PET or other material. The anti-shatter membrane 115 can be adhered to the glass sheet and paint layer 110 by a strong adhesive, for example an optical grade acrylic adhesive. The anti-shatter membrane 115 can be from 0.05 to 0.25 mm, alternatively from 0.1 to 0.2 mm in thickness.

The glass sheet 102 and/or the transparent window portion 104 can be compressed to cause the glass to be one or more of strengthened, tempered, and convexed. As described above, the glass sheet is generally planar. However, due to the strengthening process, the glass can become slightly curved (e.g. convexed when placed over a touch screen as disclosed herein). However, because this is a slight effect, the glass sheets 102 can be considered generally planar for practical purposes. For example, the glass sheet 102 or the transparent window portion 104 can become convex by applying different amounts of pressure when the glass sheet 102 and/or the transparent window portion 104 is compressed. The glass sheet 102 and/or the transparent window portion 104 can be convex with respect to the touch screen portion of the portable electronic device when the glass touchscreen protector 100 is adhered to the portable electronic device. When glass sheet 102 and/or the transparent window portion 104 is convexed, the glass sheet 102 and/or the transparent window portion 104 can assist in preventing or avoiding the generation of interference fringes (also referred to as Newton Rings, or interference patterns) when the glass touch screen protector 100 has no force being applied and/or when normal pressure is applied to the transparent window portion 104. Unlike most of the prior art touch screen protectors which are in direct physical contact with the touch screen, the glass touch screen protector 100 does not contact the touch screen portion unless excessive force is applied to the transparent window portion 104. As a result, the glass touch screen protector 100 can assist in preventing or avoiding the generation of interference fringes during normal use.

Figure 5:
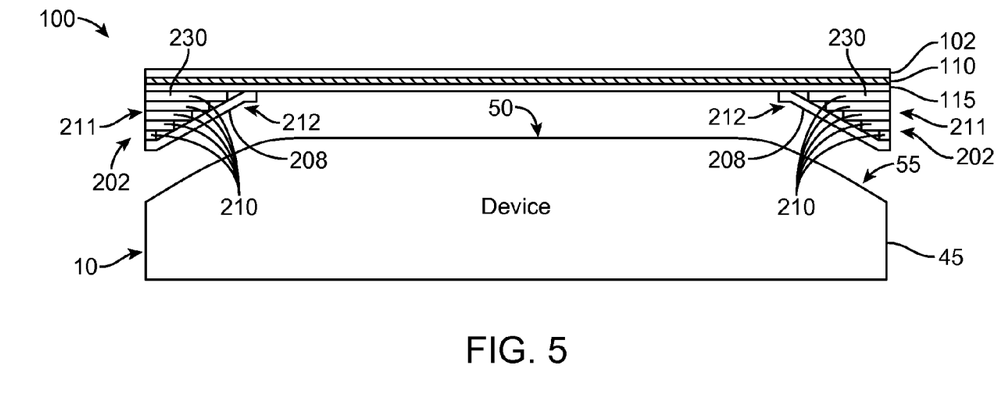
FIG. 5 is a diagram of one example of a glass touch screen protector for a portable electronic device according to the disclosure herein.

The glass sheet 102 can be illustrated in FIG. 5 can be adhered to a touch screen of a portable electronic device by means of spacer 202. The width of the spacer 202 can be the same as band 106 and/or the non-functional band of the portable electronic device. The spacer width is selected to conform to or be within the band so that the spacer does not interfere with the use of the touch screen portion when the protector is adhesively mounted onto the device. When the band 106 is opaque and when the width of the spacer 202 substantially corresponds to the width of the band 106, the spacer 104 can be substantially hidden from a direct top view when the glass touchscreen protector 100 is adhered to a portable electronic device.

The spacer 202 is provided along the outer perimeter of the glass sheet 102, substantially continuously surrounding the transparent window 104. Accordingly, there may be small gaps along the length of the spacer but still be considered substantially continuous. The spacer 202 has sufficient thickness to space the glass sheet 102 near but not in contact with the touch screen portion of the portable electronic device. The spacer spaces the underside of the glass sheet 102 (and any layers on its underside) from about 0.01 mm to 0.2 mm from the touch screen portion, and alternatively less than 1.0 mm from the touch screen portion. Further, the distance between the glass sheet and the touch screen portion is small enough to allow a capacitive value on the touch screen portion when touched on the glass sheet.

The thickness of the spacer 202 varies corresponding to the depth of the chamfered portion 55 of the portable electronic device 10. For example, the spacer 202 increases in thickness in the direction toward the periphery of the glass sheet 102. In this way, the increasing thickness of the spacer toward the periphery of the glass sheet creates an inclining ramped surface with respect to the glass sheet 102 that matches the corresponding ramped decline of the chamfered portion 55 of the front face of the device. Accordingly, in some examples, the spacer can have an approximately triangular shape. For example, the shape can be a right-triangle shape with the hypotenuse at the outer edge of the glass sheet 102.

As shown in FIG. 5, the spacer 202 can be made up of a plurality of layers 210 of adhesive which are stacked in a horizontal fashion parallel to the glass sheet 102. The plurality of layers 210 can be arranged to correspond to the declined shaped of the chamfered portion. For example, each of the plurality of layers 210 can have an exterior end 211 aligned with the edge of the glass sheet 102 and an internal end 212 facing the interior portion of the glass sheet 102. For each consecutive layer of adhesive outward from the glass sheet 102, the internal end 212 is shorter than the previous. In this way, the spacer has the greatest thickness toward the periphery of the glass sheet 102, however, when one moves toward the periphery from the interior, more layers contribute to thickness, until each layer contributes to the thickness of the spacer 202 at the edge of glass sheet 102. The internal ends 212 can form a series of steps which increase in height from the glass sheet 102 in the direction toward the periphery. The internal ends 212 can also be made diagonal so as to form a ramp rather than a staircase in the illustration.

The outermost of the plurality of adhesive layers 210 can be an exposed adhesive. The outer adhesive layer is the exposed adhesive 208 for contact with a display screen. The exposed adhesive 208 can be provided along the internal ends 212 of the plurality of layers to form a continuous ramp surface. The continuous inclined ramp surface can be shaped to correspond to the declined ramp of the chamfered portion 55 of the front face of the portable electronic device. The exposed adhesive or exposed adhesive layer 208 can have sufficient adhesiveness to mount the glass touchscreen protector 100 to a portable electronic device multiple times for repeated removal and re-attachment, and enables the removal of the glass touch screen protector 100 without leaving adhesive residue on the portable electronic device.

Each of the plurality of adhesive layers 210 can be from 0.01 to 0.5 mm per layer, alternatively from 0.1 to 0.2 mm, and alternatively about 0.1 mm in thickness. Accordingly, the spacer can be from 0.01 mm in its thinnest portion (e.g., one layer thick), up to about 0.6 mm, or 1.0 mm, or 1.5 mm or more depending on how many layers are used in its thickest portion at the periphery of the glass sheet 102. Accordingly, the spacer 202 can space the glass sheet (and any other layers on its underside) approximately about or less than 1.0 mm from the touch screen.

The plurality of adhesive layers can be made up of any type of adhesive, for example, acrylic adhesive or silicone adhesive. They each can be made up of the same adhesive or different, independent of one another. The first layer of adhesive 230 adhered directly on the glass sheet 102, or indirectly through another non-adhesive layer (such as a paint layer or anti-shatter membrane), can be made up of a stronger adhesive, for example an acrylic adhesive. The remaining plurality of layers 210 can be made up of the same or different adhesive. In some examples, the remaining plurality of layers 210 are made up of a silicone adhesive. Accordingly, the strength of the layers should be such that the exposed adhesive 208 permits repeated removability, while the first layer 230 remains adhered to the underside of glass sheet 102 (directly or indirectly). Further, the plurality of layers remains adhered to one another and do not come apart upon removal of the spacer 202 from a touch screen. Moreover, the plurality of adhesive layers can also have non-adhesive layers spaced therein, such as a plastic layer, for example a PET layer.

Figure 6:
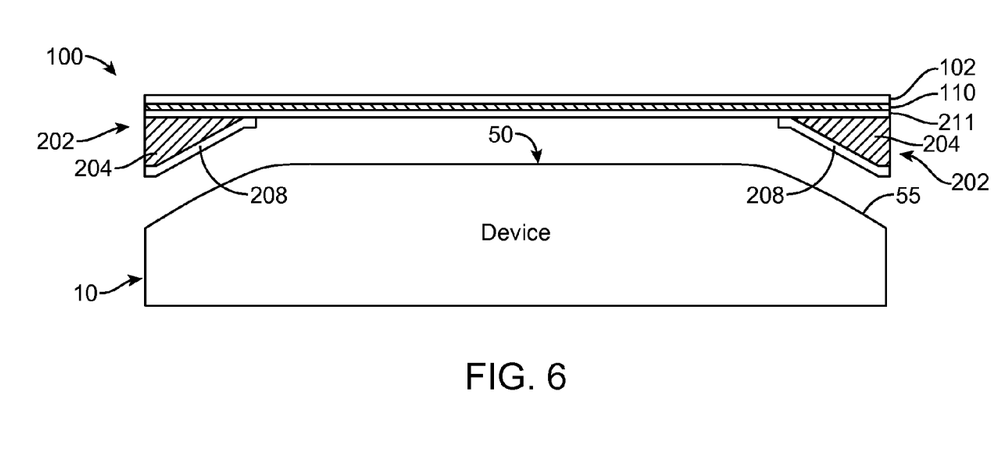
FIG. 6 is a diagram of one example of a glass touch screen protector for a portable electronic device according to the disclosure herein.

An additional example of a spacer is disclosed for example in FIG. 6. In this example, the spacer 202 is made up of an elastomeric member 204 and exposed adhesive 208. The elastomeric member 204 can be shaped to increase in thickness toward the periphery of the glass sheet. The elastomeric member 204 can have a ramp shaped incline (with respect the glass sheet 102) which corresponds in shape to the decline ramp of the chamfered portion of a portable electronic device 10. The elastomeric member 204 can be made up of a flexible material such as an elastomer. The elastomeric member 204 can be made up of a synthetic or natural rubber. For example, the spacer 202 can be made up of polyurethane (PU), ethylene-vinyl acetate (EVA), styrene-butadiene copolymers, or foams. Although in the illustrated embodiment is elastomeric member 204 is made up of an elastomer, in other embodiments, a rigid material can be used such as a rigid plastic.

In FIG. 6, the spacer 202 further has a layer of an exposed adhesive 208 adhered thereon. The exposed adhesive 208 can form a continuous ramped surface on the elastomeric member 204. The exposed adhesive 208 can have greater adhesiveness to the elastomeric member 204 than to a touch screen of a portable electronic device. Accordingly, and as described above, the exposed adhesive 208 has sufficient strength for repeated removal and re-attachment, and enables the removal of the glass touch screen protector 100 without leaving adhesive residue on the portable electronic device.

Figure 7:
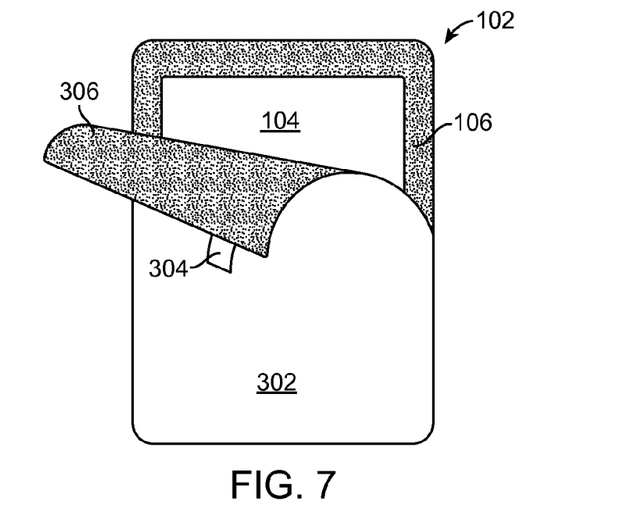
FIG. 7 is a back view of the glass touch screen protector with a portion of the backing member removed in accordance with an exemplary embodiment.

Referring to FIG. 7, a back view of a glass touch screen protector having a backing member in accordance with an exemplary embodiment is illustrated. As shown, the glass touch screen protector 100 can further include a backing member 302 to protect a back side of the touch screen protector 100 and the exposed adhesive 208 of the spacer 202. The back side of the glass touch screen protector 100 is the side that is closest to the portable electronic device when the glass touch screen protector 100 is adhered to the portable electronic device. The backing member 302 can include a tab 304 to assist in the removal of the backing member 302 prior to mounting the glass touch screen protector 100 onto the portable electronic device. By grasping and pulling on the tab 304, the backing member 302 can be removed completely from the glass touch screen protector 100 thereby exposing the adhesive 208 prior to mounting the glass touch screen protector 100 to the non-functional border of the touch screen portion of the portable electronic device. The backing member 302 can include surface 306 which permits adherence of the backing member 302 to the back side of the glass touch screen protector 100 as well as easy removal, and can optionally have adhesive thereon. There are various adhesives as described herein that are commercially available and a skilled artisan can select the particular adhesive for the specific application of adhering the backing member 302 to the back side of the glass touch screen protector 100. The adhesiveness of any adhesive on surface 306 can be weaker than the exposed adhesive 208 on the spacer 202.

Figure 8:
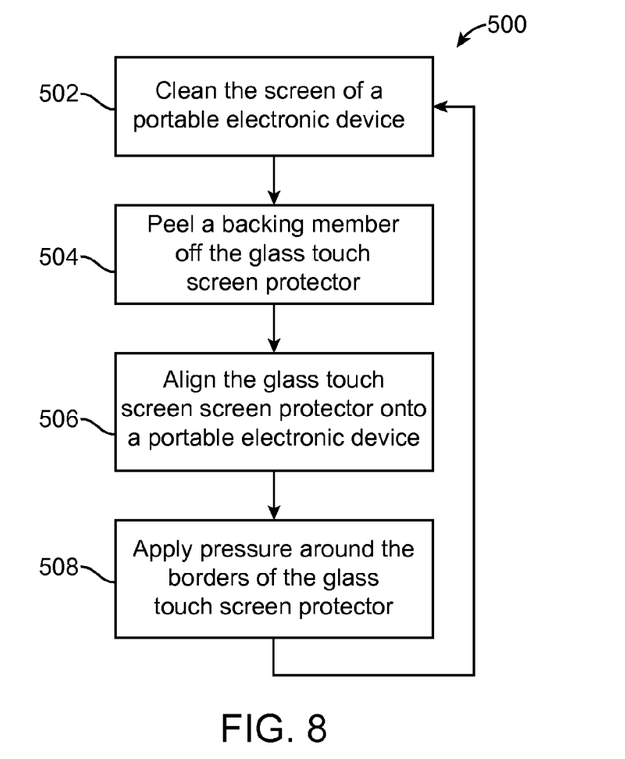
FIG. 8 is a flowchart for applying a glass touch screen protector to a portable electronic device.

Referring to FIG. 8, a method for adhering a glass touch screen protector to a portable electronic device in accordance with an exemplary embodiment is illustrated. The exemplary method 500 is provided by way of example, as there are a variety of ways to carry out the method. The method 500 described below can be carried out using the configurations illustrated in FIGS. 1-7 by way of example, and various elements of these figures are referenced in explaining exemplary method 500. Each block shown in FIG. 8 represents one or more processes, methods or subroutines, carried out in the exemplary method 500. The exemplary method 500 can begin at block 502.

At block 502, the screen of a portable electronic device is cleaned. For example, a user can use a microfiber cloth or other suitable cleaner to wipe away any dust particles on the screen of portable electronic device 10. The microfiber cloth can be included in the original packaging or can be an after-market microfiber cloth. After cleaning the screen of the portable electronic device 10, the method can proceed to block 504. At block 504, a backing member is peeled off of the glass touch screen protector. For example, the backing member 302 can be removed to expose the exposed adhesive 208 protected by the backing member 302. After removing the backing member 302, the method 500 can proceed to block 506. At block 506, the glass touch screen protector is aligned onto the portable electronic device. For example, a user can align the bottom of the glass touch screen protector 100 at the bottom including aligning any button holes. After aligning the glass touch screen protector 100 onto the portable electronic device 10, the method 500 can proceed to block 508. At block 508, pressure is applied around the borders of the glass touch screen protector to mount the glass touch screen protector on the portable electronic device. For example, the user can apply pressure on the glass touch screen protector 100, thereby pressing the exposed adhesive 208 against the portable electronic device 10, to mount the glass touch screen protector 100 onto the portable electronic device 10. After the glass touch screen protector 100 is mounted on the portable electronic device, the glass touch screen protector 100 can be removed and the method 500 can be executed again.

To assist in preventing or avoiding the generation of interference fringes during normal use, micro-particles can be applied to the underside of the glass sheet 102 and/or the transparent window portion 104. The micro-particles can be applied to the underside of a glass sheet 102 and/or the transparent window portion 104 (or a PET layer on its underside). The underside of the glass sheet 102 and/or the transparent window portion 104 is the side that is closest to the portable electronic device when the glass touch screen protector 100 is mounted on a portable electronic device. The micro-particles can be printed on the underside of the glass sheet 102 and/or the transparent window portion 104. The micro-particles are not in physical contact with the touch screen portion unless the glass touch screen protector 100 is pressed against the touch screen portion. The micro-particles can provide an anti-static effect and can quickly bounce back or pull away the glass sheet 102 and/or the transparent window portion 104 from the touch screen portion once it is no longer pressed against it. The micro-particles on the inner side of glass sheet 102 can be of various shapes, such as column shaped and/or wave shaped. The density of the micro-particles can be optimized such that they can be dense enough for providing anti-static effects but not too dense as to adversely affect the quality of images that are viewed through the window. A micro-particle covering can be more than 5% of the glass sheet 102 and/or the transparent window portion 104. Alternatively, the micro-particles covering can be more than 8% of the glass sheet 102 and/or the transparent window portion 104. Alternatively, the micro-particles covering can be more than 10% of the glass sheet 102 and/or the transparent window portion 104. If desired, the entire glass sheet 102 of the protector can be covered with micro-particles, but good results can also be achieved if up to 50% of the entire glass sheet 102 is covered. The micro-particles can be made of any transparent material commonly known in the art, such as an oleophobic coating. The micro-particles can be made up of PET so that they are compatible with the glass sheet 102. In some embodiments, the glass sheet 102 and/or the transparent window portion 104 of the glass touch screen protector 100 can include micro-particles on both sides so that the outer surface of the glass sheet 102 also does not generate static electricity during use.

The various embodiments described above are provided by way of illustration only and should not be construed to limit the scope of the disclosure. Various modifications and changes can be made to the principles and embodiments described herein without departing from the scope of the disclosure and without departing from the claims which follow.

What is claimed is:

1. A glass touch screen protector for a portable electronic device having a front face that includes a touch screen portion and a declining outer perimeter, the glass screen protector comprising:
   a glass sheet having front and back sides, an outer band that corresponds to that of the device, and having a transparent window portion that corresponds in size to the touch screen portion;
   a spacer provided along the outer perimeter of the glass sheet substantially continuously surrounding the transparent window, the spacer increasing in thickness toward the periphery of the glass sheet, the spacer having a thickness sufficient to space the glass sheet near but not in contact with the touch screen portion,
   the spacer comprising an exposed adhesive facing the portable device and having adhesive strength enabling repeated removal and re-attachment;
   wherein the spacer comprises a plurality of adhesive layers, and
   wherein the distance between the glass sheet and the touch screen portion allows a capacitive value on the touch screen portion when touched on the glass sheet.

2. The glass touch screen protector of claim 1, wherein the increasing thickness of the spacer extending towards the periphery of the glass sheet matches a corresponding ramped decline in the declining outer perimeter of the front face of the portable electronic device.

3. The glass touch screen protector of claim 1, wherein the increasing thickness of the spacer provides a continuous ramped inclining surface toward the periphery of the glass sheet.

4. The glass touch screen protector of claim 1, wherein each adhesive layer of the plurality of adhesive layers are horizontally stacked substantially parallel to the glass sheet.

5. The glass touch screen protector of claim 4, wherein each consecutive adhesive layer of the plurality of adhesive layers is shorter in length than the previous layer as the spacer increases in thickness.

6. The glass touch screen protector of claim 4, wherein each consecutive layer of the plurality adhesive layers extends a shorter distance from the periphery of the glass sheet as the spacer increases in thickness, the ends of the plurality of adhesives forming a series of steps increasing in height from the glass sheet and in the direction toward the periphery of the glass step.

7. The glass touch screen protector of claim 6, wherein the exposed adhesive is provided as a layer on the series of steps to form a continuous ramped surface.

8. The glass touch screen protector of claim 1, wherein the glass is of sufficient rigidity so as not to flex and contact the touch screen portion when pressure is applied against the glass sheet during normal usage of the portable electronic device.

9. The glass touch screen protector of claim 1 wherein the spacer spaces the glass sheet from about 0.01 mm to 0.2 mm from the touch screen portion.

10. The glass touch screen protector of claim 1, wherein the exposed adhesive is a silicone adhesive.

11. The glass touch screen protector of claim 1, wherein the glass sheet includes an opaque band about its periphery that receives the spacer.

12. The glass touch screen protector of claim 1, wherein the front face of the device has a non-functional band about a perimeter of the device and the spacer width is selected to conform to or be within the band so that the spacer does not interfere with the use of the touch screen portion when the protector is adhesively mounted onto the device.

13. The glass touch screen protector of claim 1, which further comprises one or more alignment holes that substantially correspond to one or more buttons on the device to facilitate mounting of the protector on the device.

14. The glass touch screen protector of claim 1, wherein the touch screen of the device and the glass sheet are each substantially rectangular and the touch screen is part of a telephone, reading device, music device, viewing device or navigation device.

15. The glass touch screen protector of claim 1, wherein the spacer comprises one or more layers and a plurality of adhesive layers.

16. A glass touch screen protector for a portable electronic device having a front face that includes a touch screen portion and a declining outer perimeter, the glass screen protector comprising:
   a glass sheet having front and back sides, an outer band that corresponds to that of the device, and having a transparent window portion that corresponds in size to the touch screen portion;
   a spacer provided along the outer perimeter of the glass sheet substantially continuously surrounding the transparent window, the spacer increasing in thickness toward the periphery of the glass sheet, the spacer having a thickness sufficient to space the glass sheet near but not in contact with the touch screen portion;
   the spacer comprising an exposed adhesive facing the portable device and having adhesive strength enabling repeated removal and re-attachment; and
   wherein the distance between the glass sheet and the touch screen portion allows a capacitive value on the touch screen portion when touched on the glass sheet.

17. The glass touch screen protector of claim 16, wherein the increasing thickness of the spacer extending towards the periphery of the glass sheet matches a corresponding ramped decline in the declining outer perimeter of the front face of the portable electronic device.

18. The glass touch screen protector of claim 16, wherein the increasing thickness of the spacer provides a continuous ramped inclining surface toward the periphery of the glass sheet.

19. The glass touch screen protector of claim 16, wherein the spacer comprises an elastomer.

20. The glass touch screen protector of claim 19, wherein the elastomer is shaped to have a continuous ramped inclining surface toward the periphery of the glass sheet.

21. The glass touch screen protector of claim 20, wherein the exposed adhesive is provided on the ramped inclining surface.

22. The glass touch screen protector of claim 16, wherein the glass is of sufficient rigidity so as not to flex and contact the touch screen portion when pressure is applied against the glass sheet during normal usage of the portable electronic device.

23. The glass touch screen protector of claim 16 wherein the spacer spaces the glass sheet from about 0.01 mm to 0.2 mm from the touch screen portion.

24. The glass touch screen protector of claim 16, wherein the exposed adhesive is a silicone adhesive.

25. The glass touch screen protector of claim 16, wherein the glass sheet includes an opaque band about its periphery that receives the spacer.

26. The glass touch screen protector of claim 16, wherein the front face of the device has a non-functional band about a perimeter of the device and the spacer width is selected to conform to or be within the band so that the spacer does not interfere with the use of the touch screen portion when the protector is adhesively mounted onto the device.

27. The glass touch screen protector of claim 16, which further comprises one or more alignment holes that substantially correspond to one or more buttons on the device to facilitate mounting of the protector on the device.

28. The glass touch screen protector of claim 16, wherein the touch screen of the device and the glass sheet are each substantially rectangular and the touch screen is part of a telephone, reading device, music device, viewing device or navigation device.

\* \* \* \* \*